(12) United States Patent
Kanada et al.

(10) Patent No.: US 6,307,883 B1
(45) Date of Patent: Oct. 23, 2001

(54) APPARATUS, METHOD AND SYSTEM FOR WIRELESS COMMUNICATION

(75) Inventors: Yoshihisa Kanada, Yokohama; Hiroshi Ishikawa, Shizuoka, both of (JP)

(73) Assignee: IBM Corporation, Armonk, NY (US)

( * ) Notice: Subject to any disclaimer, the term of this patent is extended or adjusted under 35 U.S.C. 154(b) by 0 days.

(21) Appl. No.: 08/852,891

(22) Filed: May 8, 1997

(30) Foreign Application Priority Data

May 21, 1996 (JP) .................................................. 8-125307

(51) Int. Cl.$^7$ ................................. H03H 7/32; H03H 7/40
(52) U.S. Cl. ............................................ 375/231; 370/292
(58) Field of Search ..................................... 375/229, 234, 375/231, 232

(56) References Cited

U.S. PATENT DOCUMENTS

| | | | | |
|---|---|---|---|---|
| 5,432,816 | * | 7/1995 | Gozzo | 375/232 |
| 5,461,640 | * | 10/1995 | Gatherer | 375/231 |
| 6,084,862 | * | 7/2000 | Bjork | 370/292 |

* cited by examiner

Primary Examiner—William Luther

(57) ABSTRACT

The subject invention improves tracking performance of an adaptive equalizing operation while reducing the calculation volume. A frame including a training sequence and a mixed data sequence in which at least one symbol of a whitened sequence is dispersively inserted into a data sequence is generated. The frame is converted into a wireless signal, which is then transmitted. The wireless signal of the frame is received. Tap coefficients of an equalization filter are set by using the training sequence in the frame. During reception of the mixed data sequence, an adaptive operation is performed by using the respective symbols of the whitened sequence in the frame and the tap coefficients of the equalization filter are updated.

18 Claims, 3 Drawing Sheets

APPARATUS, METHOD AND SYSTEM FOR WIRELESS COMMUNICATION

FIELD OF THE INVENTION

The subject invention relates to wireless communication and, particularly, to tracking performance of a whitening operation and an adaptive operation on data in wireless communication.

BACKGROUND ART

Usually, in mobile wireless communication, a transmitter sends a signal as shown in FIG. 6. That is, a wireless signal includes a training sequence 10, a header 20, and data 30. Upon reception of a wireless signal of this type, a receiver establishes synchronization with the wireless signal by using a carrier frequency or some other parameters, and calculates and sets tap coefficients etc. (an adaptive operation by an adaptive algorithm) of its own equalization filter (also called "adaptive filter") by using the training sequence 10 to eliminate influences of intersymbol interference. Once the tap coefficients of the equalization filter are set, influences of intersymbol interference can be eliminated; therefore, it becomes possible to receive data contained in the header 20 and the data 30 that follow the training sequence 10. The header 20 contains control information for the data 30 and other information, and the data 30 is the content to be sent from the transmitter to the receiver.

As described above, the tap coefficients of the equalization filter are set by using the training sequence 10. However, this does not mean that it is not necessary to perform any correcting operations during subsequent reception of the header 20 and the data 30. That is, even in a room, the state of a transmission path (propagation characteristics) is varied by, for instance, movement of a person at a slower rate than a symbol rate (data transmission rate). When the propagation characteristics vary in this manner, the tap coefficients of the equalization filter need to be varied accordingly. Therefore, calculation for updating the tap coefficients of the equalization filter is performed even during reception of the header 20 and the data 30. But the volume of this calculation is enormous. For example, where a recursive least square (RLS) algorithm, which is considered a high-convergence, stable adaptive algorithm, in complex number form, k(7k+6) times of multiplications are needed for k-stage filter taps. If k is 7 and the symbol rate is 10 MHz, a computing ability of 3.85 GIPS is needed. In practice, it is problematic to perform such calculation during reception of the header 20 and the data 30, and even the training sequence 10.

Therefore, as a realistic measure, an adaptive algorithm that is poor in characteristics but simple is used, or high-speed sampling is performed and a head portion of symbols is used which is free of intersymbol interference. However, as the transmission rate increases, these techniques can no longer be accommodated and it becomes more necessary to use an algorithm, such as the RLS algorithm, that requires a very high computing ability.

To improve the convergence in executing an adaptive algorithm as mentioned above, it is better that data to be transmitted and received is whitened. "Whitened" means that it is flat over the entire frequency range. This is because if the adaptive operation is performed for the reception data having a deviation, tap coefficients may vary in an undesired direction to cause a reception error. Usually, the header 20 and the data 30 are also whitened by, for instance, scrambling that uses an LFSR (linear feedback shift register) or the like.

Published Unexamined Patent Application (PUPA) No. 7-162361 discloses use of an adaptive algorithm for the header 20 and the data 30 as mentioned above. However, this reference has no disclosure as to a signal-like nature of the header 20 and the data 30. PUPA No. 5-145452 discloses dividing a single, long unique word into a plurality of parts and inserting those into a data portion. This purpose is to synchronize with each data part by using each part of the unique word. In addition, usually a unique word has only a minimum necessary length because a long, redundant unique word decreases a data transmission amount. It is doubtful whether each part obtained by dividing a unique word into a plurality of parts in the manner as disclosed in the Published Unexamined PUPA No. 5-145452 has a certain meaning. Further, where divided parts are meaningful only as a whole, it is necessary to process a unique word after receiving the entire data, storing it in a buffer, receiving all the divided parts of the unique word, and setting tap coefficients.

As described above, there exists no effective method of reducing the calculation volume of tap coefficients tracking operation after tap coefficients of an equalization filter have been set by using a training sequence.

SUMMARY OF THE INVENTION

An object of the subject invention is therefore to reduce the calculation volume of tap coefficients tracking operation.

Another object of the invention is to enhance whiteness of data by using a whitened version of a signal that is used for tap coefficients tracking operation.

To attain the above objects and remedy problems with the prior art, the subject invention provides a wireless communication apparatus comprising frame generating means for generating a frame including a training sequence and a mixed data sequence in which a symbol of a whitened sequence is dispersively inserted into a data sequence; and means for converting the frame into a wireless signal, and for transmitting the wireless signal. With this configuration, a signal in the data sequence is whitened and, in a reception-side wireless communication apparatus, tap coefficients can be updated without causing deviation because an adaptive operation is performed on a whitened sequence. Further, the dispersive insertion allows reduction of the computing ability.

With the above transmission-side wireless communication apparatus, there is used, in the reception side, a wireless communication apparatus comprising receiving means for receiving a wireless signal of a frame including a training sequence and a mixed data sequence in which a symbol of a whitened sequence is dispersively inserted into a data sequence; an equalization filter connected to the receiving means; adaptive operation means for setting tap coefficients of the equalization filter by using the training sequence in the frame; and tracking means for performing an adaptive operation by using the respective symbols of the whitened sequence in the frame during reception of the mixed data sequence, and thereby updating the tap coefficients of the equalization filter.

There may be conceived a configuration in which the above-mentioned whitened sequence is a training sequence. Since the training sequence is a signal that is not only known in both the transmission and reception sides but is also whitened, the tracking operation is simplified.

The tracking means may comprise means for detecting, for each symbol of the whitened sequence in the frame, an error between a first value obtained through the equalization filter and a second value that would have been transmitted to this apparatus and is predicted from said first value; and means for updating the tap coefficients of the equalization filter by using the error. That is, even if the whitened sequence is known in neither the transmission side nor the reception side, an error can be detected because tap coefficients of the equalization filter have been set by using the training sequence located at the head of the frame.

Further, there may be conceived a configuration in which the tracking means comprises comparing means for comparing, for each symbol of the training sequence as the whitened sequence in the frame, a first value obtained through the equalization filter and a second value of a corresponding symbol of the training sequence; and means for updating the tap coefficients of the equalization filter by using a result of the comparison.

The above-mentioned frame generating means may comprise means for inserting n symbol of the whitened sequence for every m symbols of the mixed data sequence. This type of regular insertion of some symbols of the whitened sequence reduces the load of the reception side. N is an integer equal to or more then 1, but the upper limit may be the number of the tap of the adaptive filter.

Further, there may be conceived a configuration in which the frame generating means comprises means for performing an operation for imparting whiteness to the data sequence. If the data sequence portion is also whitened, the entire frame is whitened, contributing to reduction of reception errors.

Furthermore, it is considered that the mixed sequence is created by dispersively inserting respective n symbols of a whitened sequence into a data sequence. It is also considered that the tracking operation means performs the adaptive operation by a portion of symbols of the whitened sequence.

DETAILED DESCRIPTION OF THE PREFERRED EMBODIMENT

Figure 1:
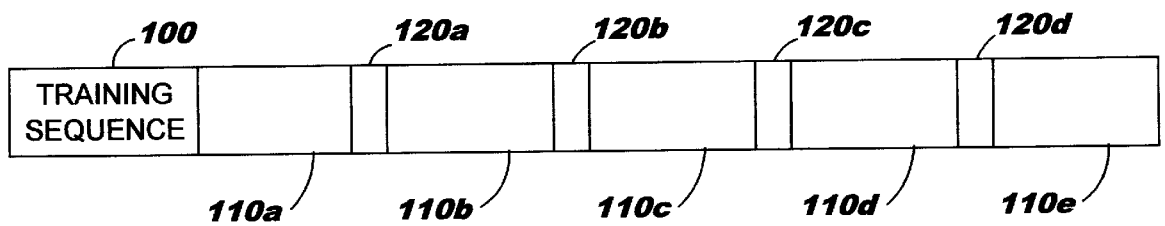
FIG. 1 shows a transmission frame according to the subject invention.
Figure 6:
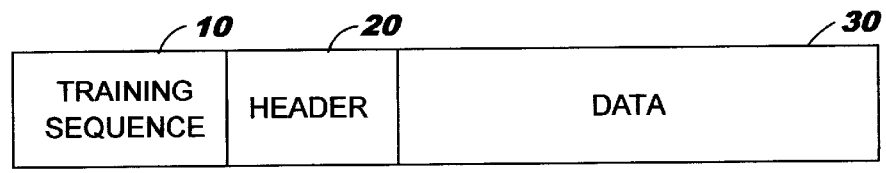
FIG. 6 shows a conventional transmission frame.

To begin with, FIG. 1 shows contents of a frame, which is a transmission signal of the subject invention. A training sequence 100 is similar to the training sequence of FIG. 6. Each of the data sequence portions 110a–110e is a collection of the header 20 and the data 30 of FIG. 6. Respective n symbols 120a–120d of a whitened sequence are inserted between the data sequence portions. A mixed sequence of the data sequence and the whitened sequence is formed in this manner. In general, respective n symbols of a whitened sequence are inserted for every m–n symbols that are a data sequence portion. As described above, n is an integer equal to or more than 1, but preferably, the upper limit is the number of taps of an adaptive filter 320 shown in FIG. 4. When n increases, there is an advantage in which the merit of this invention is accelerated if m increases.

Figure 2:
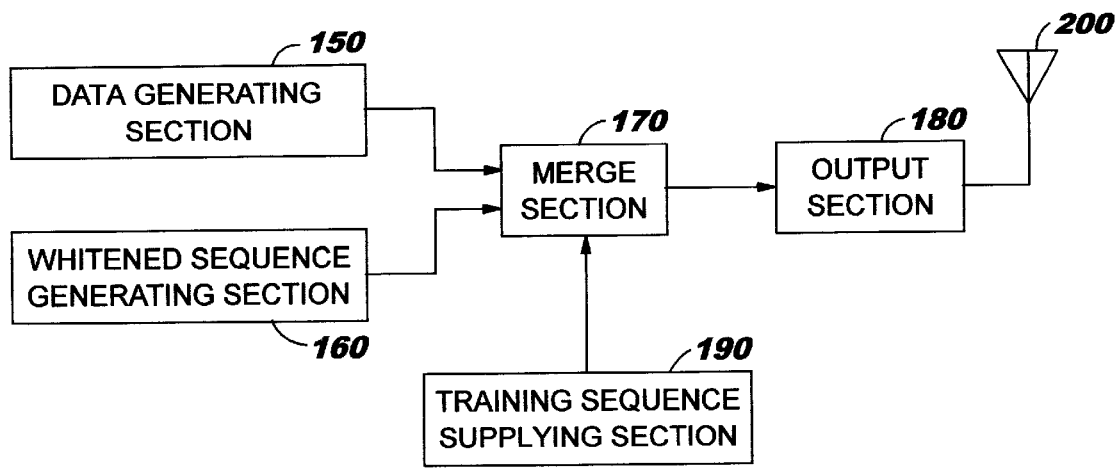
FIG. 2 is a block diagram showing the configuration of a transmission-side wireless communication apparatus according to the invention.

FIG. 2 shows a transmission-side wireless communication apparatus for generating a frame as mentioned above. A data generating section 150 and a whitened sequence generating section 160 are connected to a merge section 170. A training sequence supplying section 190 is also connected to the merge section 170. A frame to be transmitted is constructed by these four sections. The merge section 170 is connected to an output section 180, which is in turn connected to an antenna 200.

The data generating section 150 is a section like a computer which generates a data sequence to be transmitted. A generated data sequence is subjected to scrambling by using, for instance, an LFSR as mentioned above and thereby pseudo-whitened. On the other hand, the whitened sequence generating section 160 generates a whitened sequence. The merge section 170 extracts n symbols from the whitened sequence that is generated by the whitened sequence generating section 160 for every m–n symbols of the data sequence generated by the data sequence generating section 150. The merge section 160 constructs a frame by using, as a head, a training sequence that is supplied from the training sequence supplying section 190 and repeating a mixed data sequence of a data sequence of m–n symbols and a whitened sequence of n symbols at a given number of times, and supplies the thus-constructed frame to the output section 180. The output section 180 modulates and amplifies the received frame, and outputs a resulting wireless signal from the antenna 200.

Figure 3:
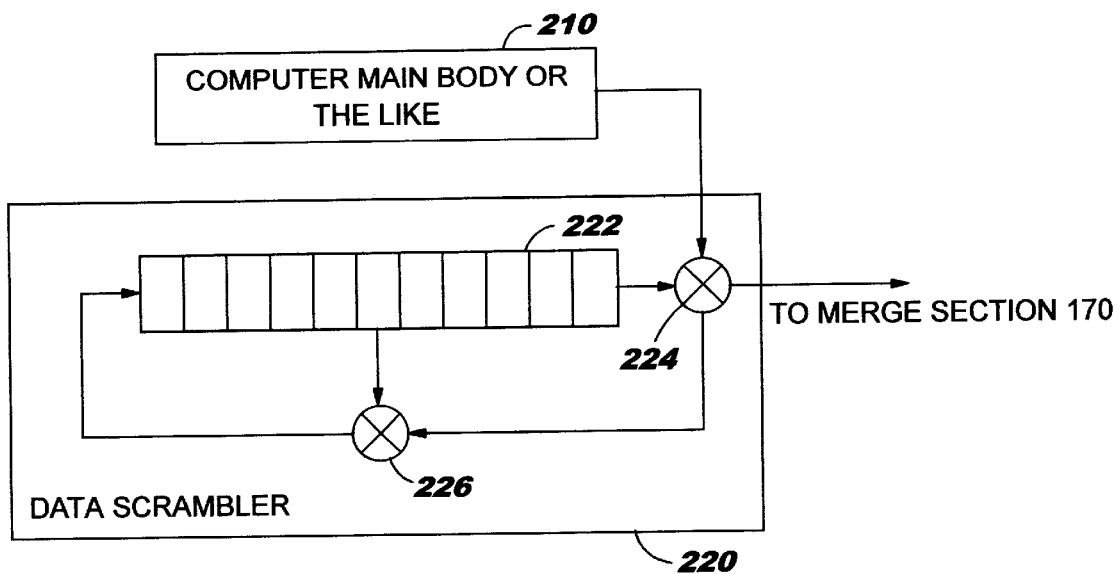
FIG. 3 shows details of a data generating section 150 in FIG. 2.

FIG. 3 shows the configuration of the data generator 150. A computer main body or the like 210 that generates data is connected to a data scrambler 220. As described above, an output of the data scrambler 220 is supplied to the merge section 170.

The data scrambler 220 is composed of an exclusive OR computing elements 224 and 226 and a shift register 222. This is an example of a whitening device using an LFSR. First, the shift register 222 is initialized. When a certain value is supplied to the input of the shift register, a pseudo-whitened sequence can be generated at the output of the shift register 222 by action of the two exclusive OR computing elements 224 and 226. A whitened data sequence is generated by exclusive-ORing the output of the shift register 222 and data supplied from the computer main body or the like 210. With this processing, the data itself is pseudo-whitened.

The whitened sequence generating section 160 can be constructed in a similar manner. In this case, since there is no input such as an input from the computer main body or the like 210, the exclusive OR computing element 224 is removed and the output of the shift register 222 is connected to the merge section 170 and the exclusive OR computing element 226.

It is noted that, as described above, a whitened sequence can be replaced by a training sequence because of the nature of the training sequence. Therefore, n symbols of a training sequence can be inserted into a data sequence by using an output of the training sequence supplying section 190.

Figure 4:
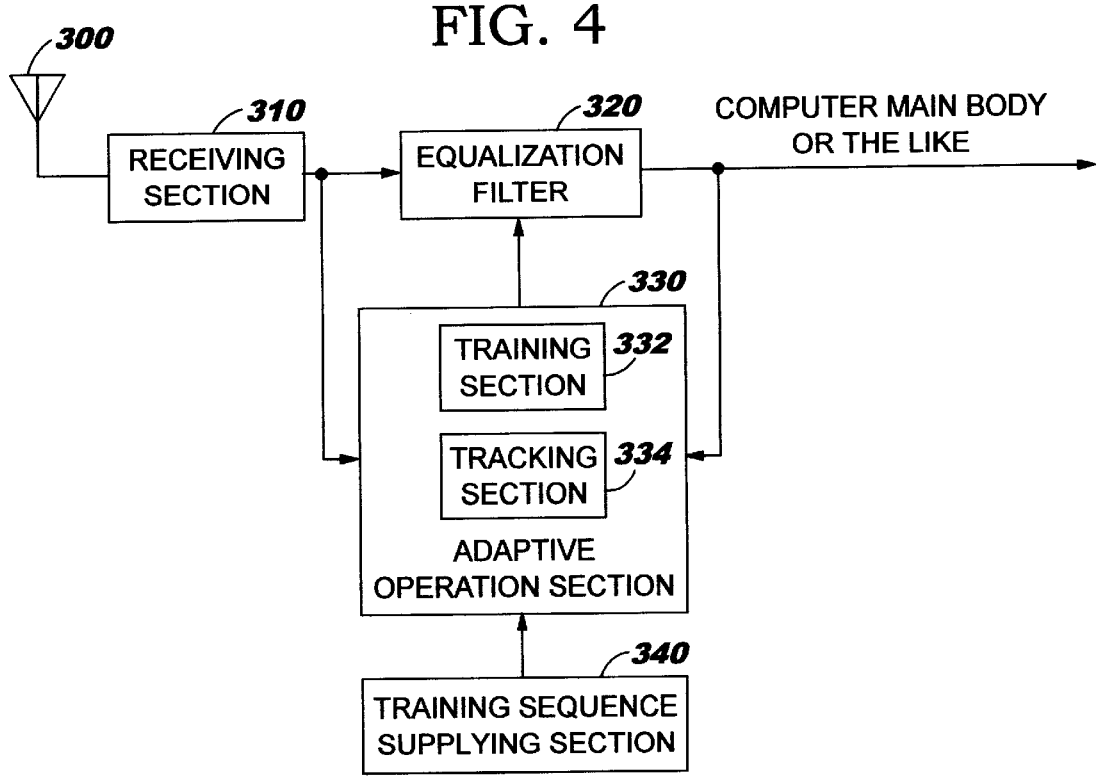
FIG. 4 is a block diagram showing the configuration of a reception-side wireless communication apparatus according to the invention.

FIG. 4 shows the configuration of a wireless receiver for receiving a frame that is output from the above-described transmission-side wireless communication apparatus. An antenna 300 is connected to a receiving section 310, which is in turn connected to an equalization filter 320 and an adaptive operation section 330. The adaptive operation section 330 is connected to a training sequence supplying section 340. The adaptive operation section 330 is composed of a training operation section 332 for performing an adaptive operation on a training sequence and a tracking section 334, which is the main part of the subject invention. An output of the equalization filter 320 is output to a computer main body or the like that is connected thereto. The equalization filter 320 may be of the same type as used in the art. Therefore, it will not be described any further.

A wireless signal received by the antenna 300 is demodulated by the receiving section 310 and subjected to a synchronizing operation. Thereafter, the training section 332 of the adaptive operation section 330 operates to set tap coefficients of the equalization filter 320 by using a training sequence 100 portion of the received frame. In this operation, a signal supplied from the training sequence supplying section 340 is used, because comparison with a stored training sequence is necessary. Upon the calculation of the tap coefficients, the training section 330 sets the equalization filter 320. An algorithm used in the training section 332 may be one used in the background art.

After the reception of the training sequence 100, at a stage of receiving a mixed data sequence portion, an output of the equalization filter 320 is input to the tracking section 334. The tracking section 334 extracts symbols 120a–120d of a whitened sequence which are inserted into the mixed data sequence and performs an adaptive operation on the extracted symbols. That is, the tracking section 334 extracts a symbol at a prescribed position for every m symbols of the mixed data sequence which have passed through the equalization filter 320, and judges whether the tap coefficients of the equalization filter 320 are appropriate. To this end, it is necessary to detect distortion that has been caused by the reception of the symbols of the whitened sequence concerned through the transmission path and the equalization filter 320. Since the tap coefficients have been set by the training section 332, the tracking section 334 predicts a probable value with an assumption that a value of a signal coming from the equalization filter 320 is approximately equal to a value of a transmitted signal, and re-calculates tap coefficients based on an error between the predicted value and an output value of the equalization filter 320. For example, if an output of the equalization filter 320 is 1.2, it is judged that a transmitted value is 1. It is preferred that the above-mentioned RLS method be used to calculate tap coefficients.

Although the above-mentioned RLS method requires a large calculation volume, the number of multiplications per symbol can be reduced to k(7k+6)/m because calculation is performed only at a low rate of one symbol per m symbols. For example, at a transfer rate equivalent to the above, the calculation volume can be reduced to 962.5 MIPS if m=4.

Where the same signal as the above-mentioned training sequence 100 is used as a whitened sequence, an output of the training sequence supplying section 340 is also supplied to the tracking section 334. The tracking section 334 compares a value supplied from the training sequence supplying section 340 and a value of a signal coming from the equalization filter 320, and uses a comparison result for the adaptive operation.

Figure 5:
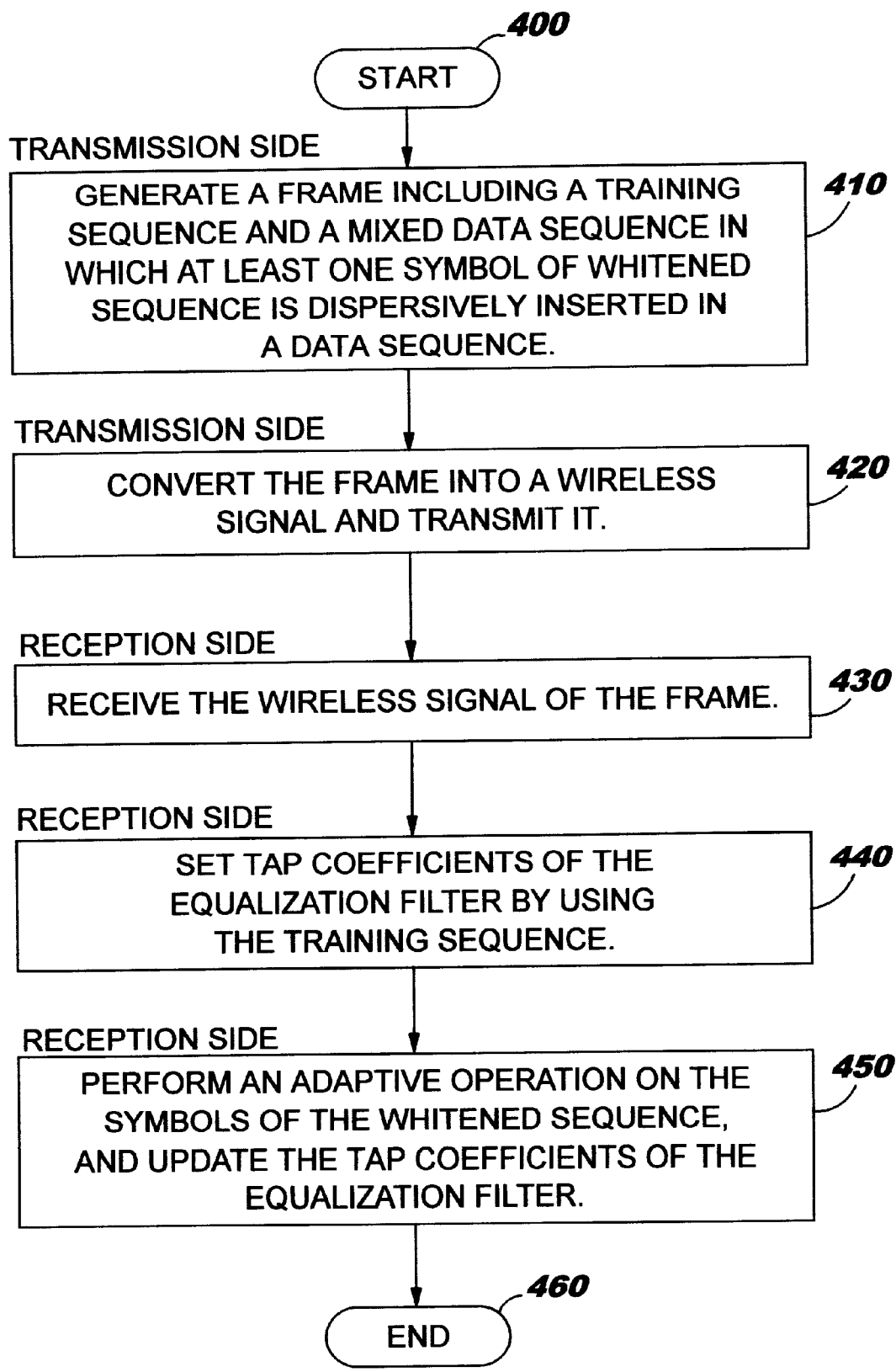
FIG. 5 shows a flow of the operation of the invention.

FIG. 5 shows the above-described processing sequence.

A. A frame including a training sequence and a mixed data sequence in which at least one symbol of a whitened sequence is dispersively inserted into a data sequence is generated. (step 410)

B. The frame is converted into a wireless signal, which is then transmitted. (step 420)

C. The wireless signal of the frame is received. (step 430)

D. Tap coefficients of the equalization filter are set by using the training sequence in the frame. (step 440)

E. During reception of the mixed data sequence, an adaptive operation is performed by using the respective symbols of the whitened sequence in the frame and the tap coefficients of the equalization filter are updated. (step 450)

The above-described embodiment is just one example and various modifications are possible. For example, while in the embodiment n symbols of a whitened sequence is inserted for every m symbols of a mixed data sequence, the insertion need not always be performed in such a regular manner as long as the reception side knows insertion positions. For example, the insertion may be conducted such that after insertion of one symbol per four symbols, one symbol is inserted per three symbols. However, if deviation is large, there may occur a case in which the calculation volume of the adaptive operation is not reduced. Further, when the status etc. of a transmission path is stable, there may be conceived a case where the transmission side informs the reception side that one symbol will be inserted per eight symbols from now on though one symbol have been inserted per four symbols so far.

Similarly, a configuration is possible that the insertion may be conducted such that after insertion of one symbol per four symbols, two symbols are inserted per eight symbols. But a burden of the receiving side apparatus increases in such a manner. The tracking operation may be performed for a portion of n symbols but the other portion may be waste.

Further, although, in FIG. 3, the computer main body or the like 210 is provided with a data scrambler 220, it may not be provided. This is because a certain degree of whitening is performed by using an output of the whitened sequence generating section 160. Further, the training sequence supplying section 190 and 340 may be memories, or registers that output a given sequence in the same manner at each time.

It has been verified by a simulation that a signal modulated by QAM (quadrature amplitude modulation) can be sufficiently equalized by inserting a teacher signal into a data sequence at a rate of one symbol per four symbols in an environment in which there exists, over three symbols, intersymbol interference whose intensity is approximately half that of a direct wave.

Advantages of the Invention

As described above, it has become possible to reduce the calculation volume of the tap coefficients tracking operation.

By inserting a whitened sequence, it has become possible to enhance whitening of a data sequence.

It is noted that the transmission rate is decreased by inserting a whitened sequence, but the transmission rate itself can easily be increased because the calculation volume can be reduced without lowering the tracking performance.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed is:

1. A wireless communication apparatus comprising:
 a frame generating means for generating a frame including a training sequence and a mixed data sequence in which a symbol of a whitened sequence is dispersively inserted into a data sequence; and
 a means for converting the frame into a wireless signal, and for transmitting the wireless signal.

2. A wireless communication apparatus comprising:
 a receiving means for receiving a wireless signal of a frame including a training sequence and a mixed data sequence in which a symbol of a whitened sequence is dispersively inserted into a data sequence;

an equalization filter connected to said receiving means;

adaptive operation means for setting tap coefficients of said equalization filter by using the training sequence in the frame; and tracking means for performing an adaptive operation by using the respective symbols of the whitened sequence in the frame during reception of the mixed data sequence to update the tap coefficients of said equalization filter.

3. The wireless communication apparatus according to claim 1, wherein the whitened sequence is a training sequence.

4. The wireless communication apparatus according to claim 2, wherein the whitened sequence is a training sequence.

5. The wireless communication apparatus according to claim 2, wherein the tracking means comprises:

means for detecting, for each symbol of the whitened sequence in the frame, an error between a first value obtained through said equalization filter and a second value that would have been transmitted to the apparatus and is predicted from said first value; and means for updating the tap coefficients of said equalization filter by using the error.

6. The wireless communication apparatus according to claim 3, wherein the tracking means comprises:

comparing means for comparing, for each symbol of the training sequence as the whitened sequence in the frame, a first value obtained through said equalization filter and a second value of a corresponding symbol of the training sequence; and means for updating the tap coefficients of said equalization filter by using a result of the comparison.

7. The wireless communication apparatus according to claim 1, wherein said frame generating means comprises means for inserting n symbols of the whitened sequence for every m symbols of the mixed data sequence.

8. The wireless communication apparatus according to claim 1, wherein said frame generating means comprises means for performing an operation for imparting whiteness to the data sequence.

9. A wireless communication apparatus comprising:

frame generating means for generating a frame including a training sequence and a mixed data sequence in which a symbol of a whitened sequence is dispersively inserted into a data sequence;

means for converting the frame into a wireless signal, and for transmitting the wireless signal;

receiving means for receiving the wireless signal of the frame;

an equalization filter connected to the receiving means;

adaptive equalizing means for setting tap coefficients of said equalization filter by using the training sequence in the frame; and tracking means for performing an adaptive operation by using the respective symbols of the whitened sequence in the frame during reception of the mixed data sequence, and thereby updating the tap coefficients of said equalization filter.

10. A wireless communication method, comprising the steps of:

generating a frame including a training sequence and a mixed data sequence in which a symbol of a whitened sequence is dispersively inserted into a data sequence;

converting the frame into a wireless signal, and transmitting the wireless signal;

receiving the wireless signal of the frame;

setting tap coefficients of an equalization filter by using the training sequence in the frame; and performing an adaptive operation by using the respective symbols of the whitened sequence in the frame during reception of the mixed data sequence, and thereby updating the tap coefficients of the equalization filter.

11. A wireless communication system having:

a wireless transmitter having a frame generating means for generating a frame including a training sequence and a mixed data sequence in which a symbol of a whitened sequence is dispersively inserted into a data sequence, and a means for converting the frame into a wireless signal, and for transmitting the wireless signal; and a wireless receiver having a receiving means for receiving the wireless signal of the frame, an equalization filter connected to said receiving means, an adaptive operation means for setting tap coefficients of said equalization filter by using the training sequence in the frame, and a tracking means for performing an adaptive operation by using the respective symbols of the whitened sequence in the frame during reception of the mixed data sequence, and thereby updating the tap coefficients of the equalization filter.

12. A wireless communication apparatus, comprising:

a frame generating means for generating a frame including a training sequence and a mixed data sequence in which respective n symbols of a whitened sequence are dispersively inserted into a data sequence; and means for converting the frame into a wireless signal, and for transmitting the wireless signal.

13. A wireless communication apparatus, comprising:

receiving means for receiving a wireless signal of a frame including a training sequence and a mixed data sequence in which respective n symbols of a whitened sequence are dispersively inserted into a data sequence;

an equalization filter connected to said receiving means;

adaptive operation means for setting tap coefficients of said equalization filter by using the training sequence in the frame; and tracking means for performing an adaptive operation by using a symbol of the whitened sequence in the frame during reception of the mixed data sequence, and thereby updating the tap coefficients of said equalization filter.

14. A wireless communication method, comprising the steps of:

generating a frame including a training sequence and a mixed data sequence in which a symbol of a whitened sequence is dispersively inserted into a data sequence; and converting the frame into a wireless signal, and transmitting the wireless signal.

15. A wireless communication method, comprising the steps of:

receiving a wireless signal of a frame;

setting tap coefficients of an equalization filter by using a training sequence in the frame; and performing an adaptive operation by using respective symbols of a whitened sequence in the frame during reception of a mixed data sequence, and thereby updating the tap coefficients of the equalization filter.

16. The wireless communication method of claim 14, further comprising the steps of:

receiving the wireless signal of the frame; and performing an adaptive operation by using the respective symbols of the whitened sequence dispersed in the frame during the reception of the mixed data sequence, and thereby updating tap coefficients of an equalization filter, the tap coefficients having previously been set by using the training sequence in the frame.

17. A wireless communication method, comprising the steps of:

receiving a wireless signal of a frame; and performing an adaptive operation by using respective symbols of a whitened sequence dispersed in a mixed data sequence in the frame and thereby updating tap coefficients of an equalization filter.

18. The wireless communication method of claim 14, further comprising the steps of:

receiving the wireless signal of the frame;

setting tap coefficients of an equalization filter which filters the wireless signal by using the training sequence;

tracking the symbols of the whitened sequence dispersed in the data sequence; and performing an adaptive operation by using the respective symbols of the whitened sequence during the reception of the mixed data sequence, and thereby updating the tap coefficients of the equalization filter.

* * * * *